United States Patent [19]
Yamada et al.

[11] Patent Number: 5,590,380
[45] Date of Patent: Dec. 31, 1996

[54] MULTIPROCESSOR SYSTEM WITH PROCESSOR ARBITRATION AND PRIORITY LEVEL SETTING BY THE SELECTED PROCESSOR

[75] Inventors: Kunio Yamada, Tokyo; Michio Sawada, Yachiyo, both of Japan

[73] Assignee: Kabushiki Kaisha Toshiba, Kawasaki, Japan

[21] Appl. No.: 386,332

[22] Filed: Feb. 10, 1995

Related U.S. Application Data

[63] Continuation of Ser. No. 50,774, Apr. 22, 1993, abandoned.

[30] Foreign Application Priority Data

Apr. 22, 1992 [JP] Japan .................... 4-103083

[51] Int. Cl.⁶ .................... G06F 13/26; G06F 13/37
[52] U.S. Cl. .................... 395/868; 395/733
[58] Field of Search .................... 395/868, 291, 395/733, 735, 737, 728

[56] References Cited

U.S. PATENT DOCUMENTS

| | | | |
|---|---|---|---|
| 3,665,404 | 5/1972 | Werner | 395/735 |
| 4,381,542 | 4/1983 | Binder et al. | 395/737 |
| 4,449,183 | 5/1984 | Flahive et al. | 395/478 |
| 4,504,906 | 3/1985 | Itaya et al. | 395/280 |
| 5,072,363 | 12/1991 | Gallagher | 395/729 |
| 5,072,365 | 12/1991 | Burgess et al. | 395/737 |
| 5,088,024 | 2/1992 | Vernon et al. | 395/291 |
| 5,099,414 | 3/1992 | Cole et al. | 395/200.06 |
| 5,265,215 | 11/1993 | Fukuda et al. | 395/303 |
| 5,282,272 | 1/1994 | Guy et al. | 395/200.06 |
| 5,297,290 | 3/1994 | Masui et al. | 395/740 |

FOREIGN PATENT DOCUMENTS 3210654  9/1991  Japan .

OTHER PUBLICATIONS

Intel Advance Information 83289, "Message Passing Coprocessor a Multibus II Bus Interface Controller", Feb. 1988.

Primary Examiner—Parshotam S. Lall
Assistant Examiner—Viet Vu
Attorney, Agent, or Firm—Cushman Darby & Cushman IP Group of Pillsbury Madison & Sutro LLP

[57] ABSTRACT

According to this invention, an interrupt right control unit transfers an interrupt right to a succeeding processor module. When the processor module has the interrupt right, and the interrupt right control unit receives an interrupt signal, the interrupt right control unit outputs an interrupt signal to a corresponding processor and stops transferring the interrupt right. The corresponding processor then sets the priority levels for the processor modules and performs interrupt processing in response to the interrupt signal. Then the corresponding processor causes the interrupt right control unit to continue the transferring of the interrupt right.

11 Claims, 9 Drawing Sheets

MULTIPROCESSOR SYSTEM WITH PROCESSOR ARBITRATION AND PRIORITY LEVEL SETTING BY THE SELECTED PROCESSOR

This is a continuation of application Ser. No. 08/050,774, filed on Apr. 22, 1993 now abandoned, which was abandoned upon the filing hereof.

BACKGROUND OF THE INVENTION

1. Field of the Invention

The present invention relates to a multiprocessor system and, more particularly, to a computer system having interrupt controllers in units of processor modules.

2. Description of the Related Art

In a conventional multiprocessor system, a first method of causing an I/O interface to supply an interrupt signal to a processor is known as a method of causing an input/output (I/O) interface (device) to interrupt a processor. According to this method, the input/output (I/O) interface designates one processor, and the interrupt signal is supplied to the designated processor.

According to the second method, processors are connected to I/O interfaces with special hardware (communication circuit or the like), and each of the I/O interfaces can supply an interrupt signal to only a predetermined processor.

In either method, interrupt controllers and processors are arranged in a one-to-one correspondence. When each I/O interface generates an interrupt request, each interrupt controller outputs an interrupt signal to a corresponding processor.

However, according to the first method, when a processor designated by an I/O interface cannot receive the interrupt signal, the interrupt request from the I/O interface is set in a standby state, and processing is delayed. On the other hand, according to the second method, the processors are connected to the I/O interface through special hardware in advance. Therefore, interrupt control of the microprocessor is quite different from interrupt control of a single-microprocessor system. For this reason, single-processor software must be considerably changed to be used in a microprocessor.

SUMMARY OF THE INVENTION

The present invention has been made in consideration of the above circumstances, and has as its object to improve the efficiency of interrupt processing.

It is another object of the present invention to provide a multiprocessor system in which, when a given processor cannot receive an interrupt request, the remaining processors can receive the interrupt request.

In order to achieve the above objects, according to the present invention, when an interrupt right control means has an interrupt right, the interrupt right control means performs control to output an interrupt signal from a corresponding interrupt controller to a corresponding processor, and stop transferring the interrupt right. In addition, when a processor accesses an input/output interface, an interrupt temporary mask means sets a mask for an interrupt request signal from the input/output interface in the interrupt controller and resets the mask in response to transfer of the interrupt right from the interrupt control means upon generating an interrupt request signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described below with reference to the accompanying drawings.

Figure 1:
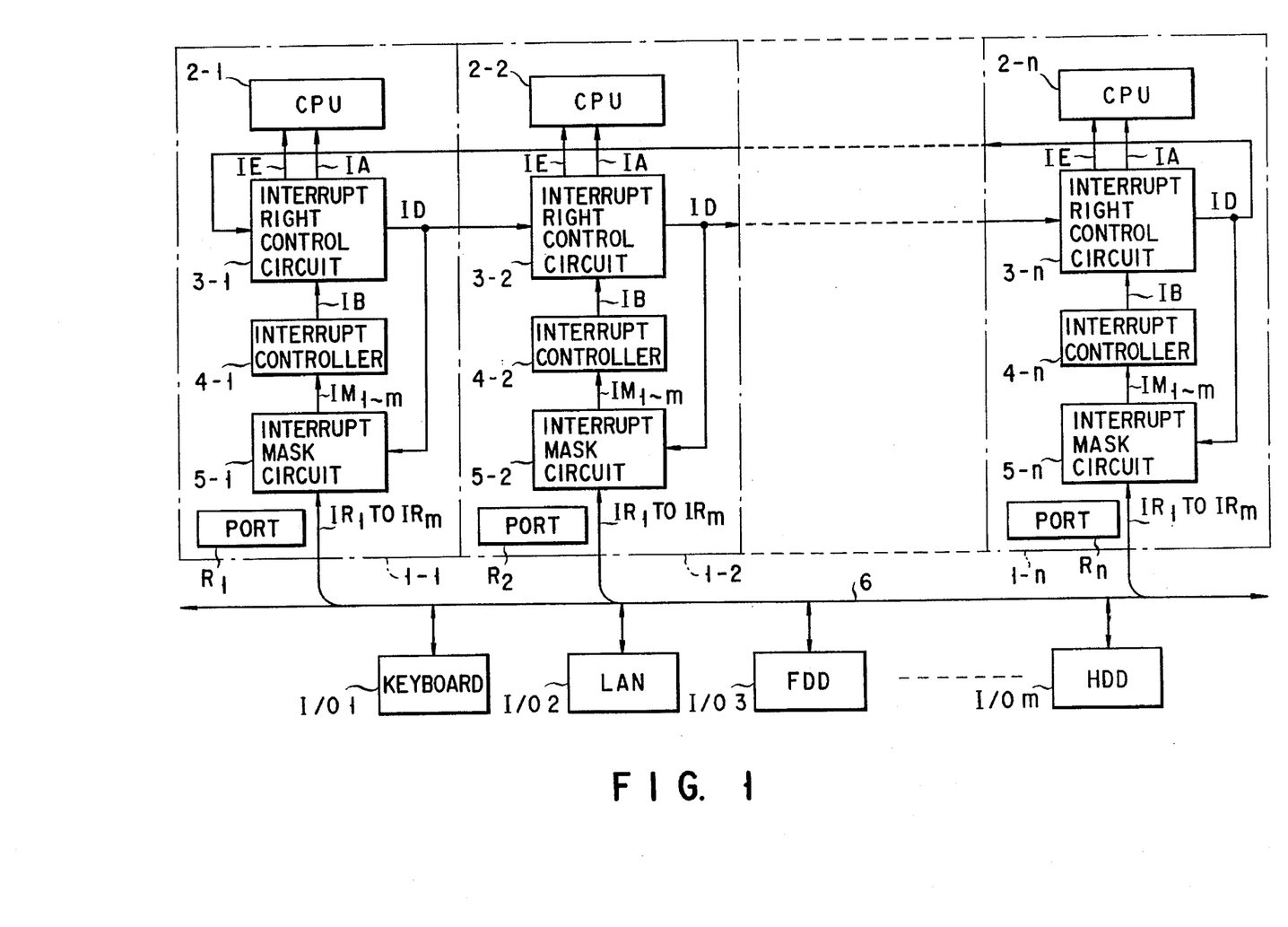
FIG. 1 is a block diagram showing the arrangement of a multiprocessor system according to the first embodiment of the present invention.

FIG. 1 is a block diagram showing the arrangement of a tight coupling multiprocessor system according to the first embodiment of the present invention. This tight coupling multiprocessor system comprises a plurality of processor modules 1-1 to 1-n connected to each other through a system bus 6. Input/output (I/O) interfaces (devices) such as a keyboard I/O1, a local area network (LAN) I/O2, a floppy disk drive (FDD) I/O3, and a hard disk drive (HDD) I/Om are connected to the system bus 6.

The processor modules 1-1 to 1-n have CPUs (Central Processing Units) 2-1 to 2-n, interrupt right control circuits 3-1 to 3-n, interrupt controllers 4-1 to 4-n, interrupt mask circuits 5-1 to 5-n, and ports $R_1$ to $R_n$, respectively.

Figure 2:
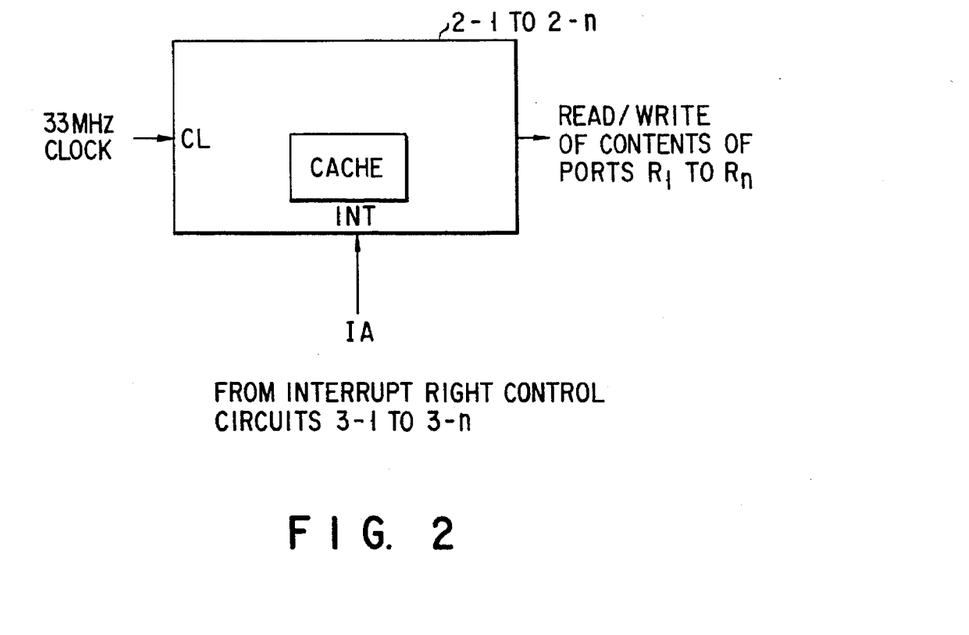
FIG. 2 is a view showing the arrangement of a CPU.

Each of the CPUs 2-1 to 2-n has an internal cache memory as shown in FIG. 2 and is operated in synchronism with a clock signal of e.g., 33 MHz. The CPUs 2-1 to 2-n are controlled by a common OS (operating system) and access a shared I/O interface. Each of the CPUs 2-1 to 2-n receives an interrupt signal IA from a corresponding one of the interrupt right control circuits 3-1 to 3-n. The CPUs 2-1 to 2-n are connected to the ports $R_1$ to $R_n$ and can read and write the ports $R_1$ to $R_n$, respectively.

Only one of the interrupt right control circuits 3-1 to 3-n receives an interrupt request from an I/O interface at a timing to supply the interrupt signal (request) to a corresponding CPU. A right of receiving an interrupt request from an I/O interface to supply the interrupt signal to a CPU is called an "interrupt right". Each of the interrupt right control circuits 3-1 to 3-n having the interrupt right supplies the interrupt signal IA to an interrupt terminal INT of a corresponding one of the CPUs 2-1 to 2-n when it receives an interrupt request from the interrupt controller 4-1 to 4-n, respectively. And each of the interrupt right control circuits 3-1 to 3-n outputs an interrupt right transfer signal ID to a corresponding one of the interrupt right control circuits 3-2 to 3-1 of the next processor modules 1-2 to 1-1 a predetermined time after the interrupt right control circuit has the interrupt right when it does not receives an interrupt request from the interrupt controller 4-1 to 4-n, respectively. Each of the interrupt right control circuits 3-1 to 3-n which outputs the interrupt right transfer signal ID loses the interrupt right, and the corresponding one of the interrupt right control circuits 3-2 to 3-1 which receives the interrupt right transfer signal ID acquires the interrupt right. Note that the interrupt right control circuit 3-n of the last stage outputs the interrupt right transfer signal ID to the interrupt right control circuit 3-1 of the first stage.

The interrupt controllers 4-1 to 4-n are PICs (Programmable Interrupt Controllers), and each of the interrupt controllers 4-1 to 4-n performs control such as mask control related to interrupt processing, level control, priority control, and generation of a vector. Although not shown, the interrupt controllers 4-1 to 4-n are connected to all the CPUs 2-1 to 2-n and controlled by any one of the CPUs 2-1 to 2-n. As each of the interrupt controllers 4-1 to 4-n, for example, an i8259A-5 available from Intel Corporation can be used.

The interrupt mask circuits 5-1 to 5-n temporarily mask the interrupt signals from the I/O devices in response to the interrupt right transfer signal ID. The CPU 2-1 to 2-n write data in the ports $R_1$ to $R_n$ to set at an active level the control signals such as IG, IH, $SM_1$ to $SM_m$ for controlling the interrupt control circuits 4-1 to 4-n and the interrupt mask circuits 5-1 to 5-n. The CPUs 2-1 to 2-n read the ports $R_1$ to $R_n$ to read an interrupt right designation signal IE.

The internal arrangements of the interrupt right control circuit, and the interrupt mask circuit will be described below.

Figure 3:
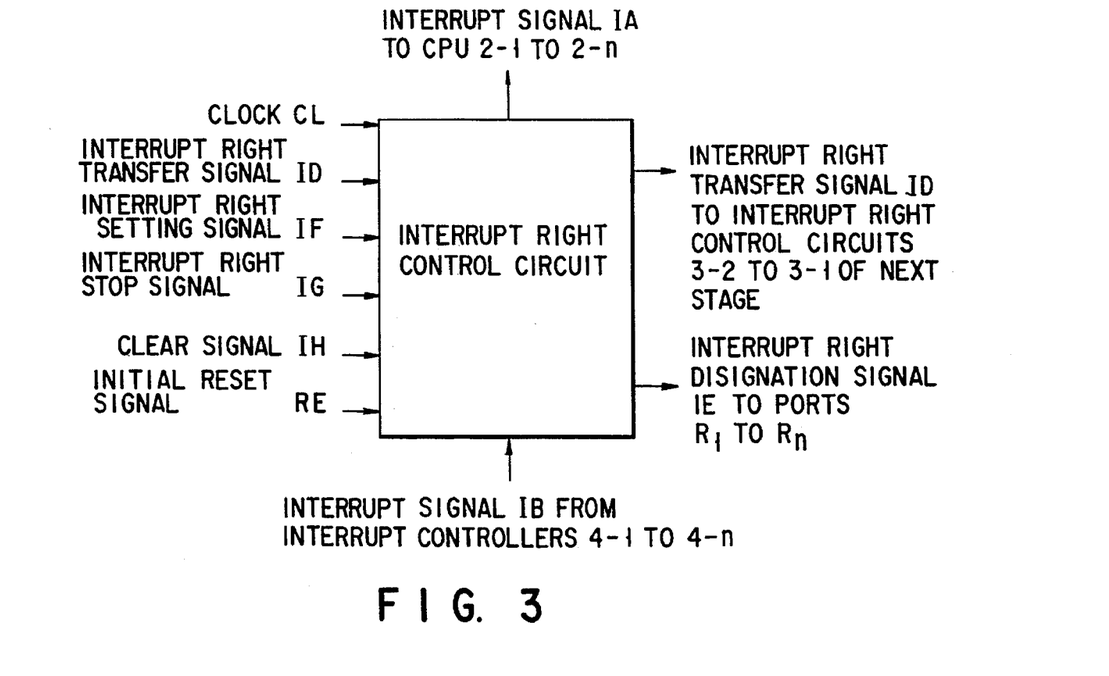
FIG. 3 is a view for explaining input/output signals of an interrupt right control circuit.

As shown in FIG. 3, the interrupt signal IB from each of the interrupt controllers 4-1 to 4-n, a clock CL from a clock generator (not shown), the interrupt right transfer signal ID from each of the interrupt right control circuits 3-n to 3-(n-1), an interrupt right stop signal IG and a clear signal IH from the ports $R_1$ to $R_n$, and an initial reset signal RE from a power supply reset circuit are supplied to a corresponding one of the interrupt right control circuits 3-1 to 3-n. Each of the interrupt right control circuits 3-1 to 3-n outputs the interrupt signal IA to a corresponding one of the CPUs 2-1 to 2-n, and outputs the interrupt right transfer signal ID to a corresponding one of the interrupt right control circuits 3-2 to 3-1.

The clock CL is, e.g., an 8-MHz basic operation clock. The interrupt right setting signal IF is a signal for giving an interrupt right to one of the interrupt right control circuits 3-1 to 3-n when the system is powered or reset. The interrupt right setting signal IF is generated, for example, by using hardware such as a pull-down/pull-up resistor. For example, the interrupt right setting signal IF supplied to the interrupt right control circuit 3-1 is set at an active level, and the interrupt right setting signal IF supplied to each of the interrupt right control circuits 3-2 to 3-n is set at an inactive level. In this manner, in an initial state, the interrupt right control circuit 3-1 acquires an interrupt right.

The interrupt right stop signal IG is to stop transferring the interrupt right. The CPUs 2-1 to 2-n set the interrupt right stop signal IG at an active level through the ports $R_1$ to $R_n$. When, for example, the interrupt right stop signal IG supplied to the interrupt right control circuit 3-1 is set at the active level, the corresponding interrupt right control circuit 3-1 stops outputting the interrupt right transfer signal ID to the interrupt right control circuit 3-2. Therefore, the interrupt right is stopped at the interrupt right control circuit 3-1, and is not transferred to the remaining interrupt right control circuits 3-2 to 3-n. When the interrupt right control circuits 3-1 to 3-n supply the interrupt signal IA to the CPU 2-1 to 2-n, the interrupt control circuits 3-1 to 3-n stops the transfer of the interrupt right.

The clear signal IH is a signal for ending an interrupt right holding state. Each of the CPUs 2-1 to 2-n sets the clear signal IH at an active level through the corresponding one of the ports $R_1$ to $R_n$.

The initial reset signal RE is a reset signal for the interrupt right control circuit, and is set at an active level by a reset circuit when the system is powered.

The interrupt right indication signal IE is a signal for indicating an interrupt right holding state. Each of the CPUs 2-1 to 2-n confirms whether a corresponding one of the processor modules 1-1 to 1-n has an interrupt right by reading the corresponding one of ports $R_1$ to $R_n$.

The arrangement of each of the interrupt right control circuits 3-1 to 3-n is represented by logical expressions (1) to (4), respectively:

$$IA:=IE*IB*/RE \quad (1)$$

$$IE:=ID(input)*/RE+IE*IB*/RE+IE*IP*/RE+IF*RE \quad (2)$$

$$IP:=IE*IB*/RE+IG*/RE+IP*/IH*/RE+IF*RE \quad (3)$$

$$ID(output):=IE*/ID(input)*/IP*/RE \quad (4)$$

where ": =" is a symbol representing a Q output from a D-type flip-flop, the left-hand side is the Q output, and the right-hand side is a D input, "*" is a logical product (AND), "+" is a logical sum (OR), and "/" is a negation (inverter).

A clock CL is supplied to the clock input terminal of each of flip-flops represented by expressions (1) to (4).

Expression (1) is a logical expression representing an operation of a flip-flop for setting the interrupt signal IA. That is, when the interrupt right indication signal IE is set to set the interrupt signal IB from a corresponding one of the interrupt controllers 4-1 to 4-n at an active level, the interrupt signal IA is set in the flip-flop. Otherwise, the flip-flop is cleared.

Figure 4:
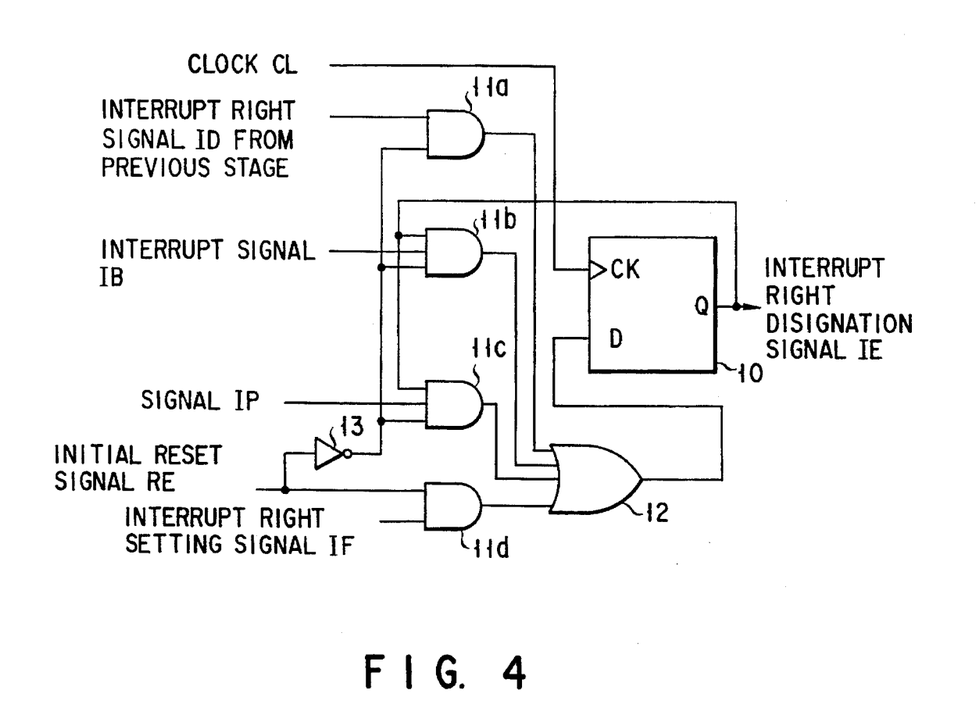
FIG. 4 is a circuit diagram for explaining the arrangement of an interrupt right control circuit.

Expression (2) is a logical expression representing an operation of a flip-flop for setting the interrupt right indication signal IE to output the signal to a corresponding one of the ports $R_1$ to $R_n$. A logic circuit corresponding to expression (2) is constituted as shown in FIG. 4. This logic circuit has a flip-flop 10, AND circuits 11a to 11d, an OR circuit 12, and an inverter 13. In the logic circuit in FIG. 4, when an interrupt right transfer signal ID from the previous stage is set at an active level, the flip-flop 10 latches the active level through the AND circuit 11a and the OR circuit 12 to output an interrupt right indication signal IE at the active level. The flip-flop 10 keeps the set state for a period when the interrupt signal IB is set at an active level or a signal IP is output.

The signal IP is, as represented by expression (3), a signal for causing each of the interrupt right control circuits 3-1 to 3-n to hold an interrupt right, and a corresponding one of the interrupt right control circuits 3-1 to 3-n holds the interrupt right and does not transfer the interrupt right to the remaining interrupt right control circuits for a period when the signals IP are set at an active level.

Figure 5:
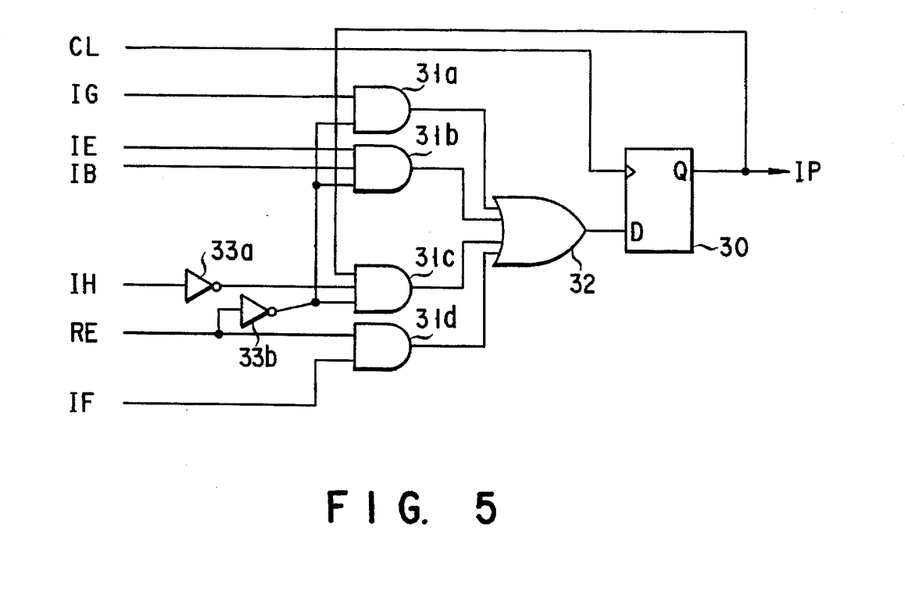
FIG. 5 is a circuit diagram for explaining the arrangement of an interrupt right control circuit.

Expression (3) is a logical expression representing an operation of a flip-flop for setting the signal IP. That is, when the interrupt right indication signal IE is set to set the interrupt signal IB from a corresponding one of the interrupt controllers 4-1 to 4-n at an active level or to set the interrupt right stop signal IG at an active level, the signal IP is set. The flip-flop keeps the set state until the clear signal IH goes to an active level. A logic circuit corresponding to expression (3) is constituted as shown in FIG. 5. This logic circuit has a flip-flop 30, AND circuits 31a to 31d, an OR circuit 32, and inverters 33a and 33b.

Expression (4) is a logical expression representing an operation of a flip-flop for setting the interrupt right transfer signal ID. When the interrupt right indication signal IE is set, the interrupt signal IB from a corresponding one of the interrupt controllers 4-1 to 4-n is at an inactive level and the signal IP is at an inactive level, the interrupt right transfer signal ID is set.

In addition, when both the interrupt right setting 10 signal IF and the reset signal RE are set at an active level, the interrupt right indication signal IE and the interrupt right stop signal IG go to an active level. On the other hand, when the interrupt right setting signal IF is set at an inactive state, and the initial reset signal RE is set at an active level, all the four flip-flops constituting each of the interrupt right control circuits 3-1 to 3-n are cleared.

Figure 6:
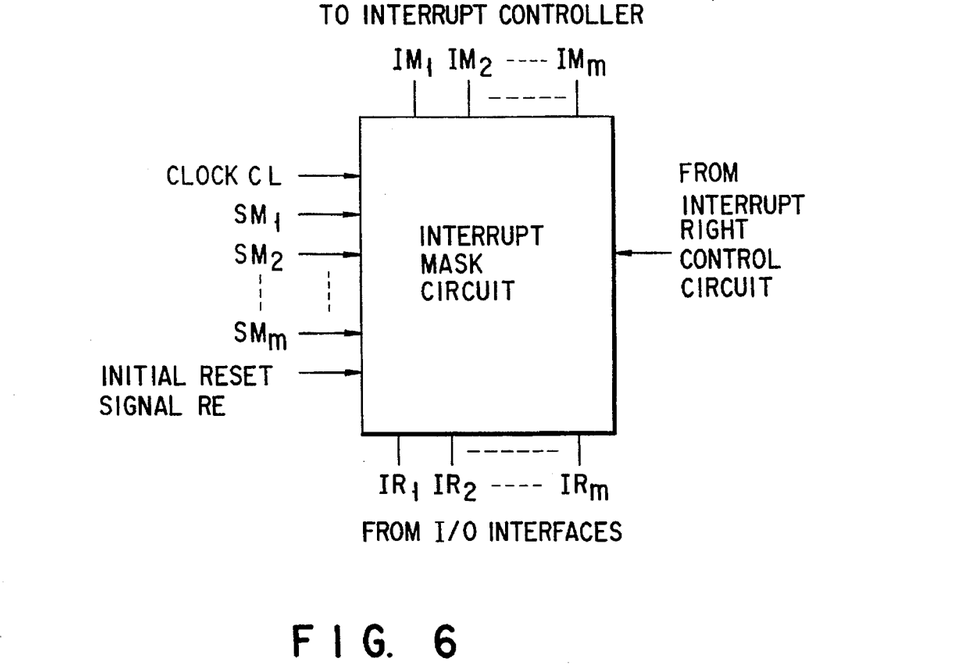
FIG. 6 is a view for explaining input/output signals of an interrupt mask circuit.

FIG. 6 shows input/output signals of each of the interrupt mask circuits 5-1 to 5-n. Each of the interrupt mask circuits 5-1 to 5-n receives interrupt request signals $IR_1$ to $IR_m$, the clock CL, the interrupt right transfer signal ID, the initial reset signal RE, and the temporary mask set signals $SM_1$ to $SM_m$, and outputs interrupt signals $IM_1$ to $IM_m$ to a corresponding one of the interrupt controllers 4-1 to 4-n.

The interrupt request signals $IR_1$ to $IR_m$ are supplied from the I/O interfaces through the system bus 6. In the circuit of FIG. 1, the interrupt signal $IR_1$, the interrupt signal $IR_2$, the interrupt signal $IR_3$, and the interrupt signal $IR_m$ correspond to an interrupt signal from the keyboard I/O1, an interrupt signal from the LAN I/O2, an interrupt signal from the floppy disk drive I/O3, and an interrupt signal from the hard disk drive I/Om, respectively. The temporary mask set signals $SM_1$ to $SM_m$ are signals for temporarily masking the interrupt request signals $IR_1$ to $IR_m$, respectively. The CPUs 2-1 to 2-n set the temporary mask set signals $SM_1$ to $SM_m$ by accessing the ports $R_1$ to $R_n$.

The arrangement of each of the interrupt mask circuits 5-1 to 5-n is represented by logical expressions (5) to (10):

$$IM1 = IR1*/MS1 \tag{5}$$

$$IM2 = IR2*/MS1 \tag{6}$$

$$IMm = IRm*/MS1 \tag{7}$$

$$MS1 := SM1*/RE + MS1*/IR1*/RE + MS1*/ID*/RE \tag{8}$$

$$MS2 := SM2*/RE + MS2*/IR2*/RE + MS2*/ID*/RE \tag{9}$$

$$MSm := SMm*/RE + MSm*/IRm*/RE + MSm*/ID*/RE \tag{10}$$

where ":=" is a symbol representing a Q output from a D-type flip-flop, the left-hand side is the Q output, the right-hand side is a D input, "*" is a logical product (AND), "+" is a logical sum (OR), and "/" is negation (inverter).

As represented by expressions (5) to (7), when the interrupt request signals $IR_1$ to $IR_m$ are set at an active level, and interrupt temporary mask flip-flops $MS_1$ to $MS_m$ corresponding to the interrupt request signals $IR_1$ to $IR_m$ are cleared, the interrupt signals $IM_1$ to $IM_m$ are set at an active level.

Expressions (8) to (10) are expressions representing the operations of the interrupt temporary mask flip-flops $MS_1$ to $MS_m$. That is, the flip-flops $MS_1$ to $MS_m$ are set when the temporary mask set signals $SM_1$ to $SM_m$ are set at an active level, and this set state is kept until both the interrupt request signals $IR_1$ to $IR_m$ from the I/O interfaces and the interrupt right transfer signal ID go to an active level. When the initial reset signal RE is set at an active level, all the flip-flops $MS_1$ to $MS_m$ are cleared.

Figure 7:
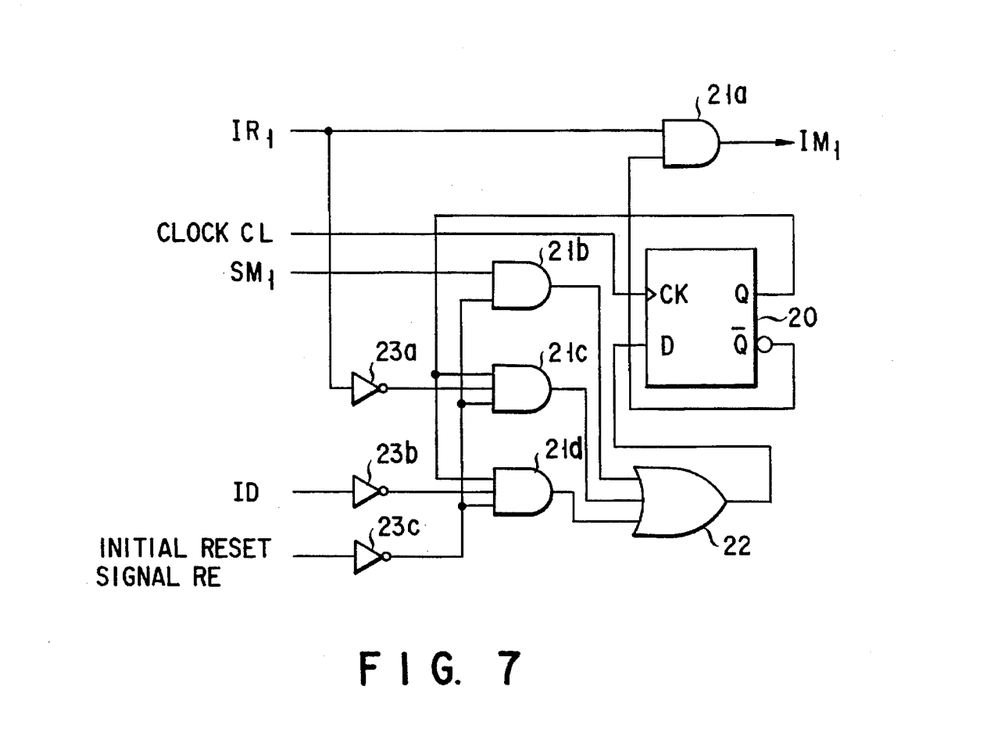
FIG. 7 is a circuit diagram for explaining the arrangement of the interrupt mask circuit.

FIG. 7 is a logic circuit according to expressions (5) and (8). This logic circuit has a flip-flop 20, AND circuits 21a to 21d, an OR circuit 22, and inverters 23a to 23c. The flip-flop 20 is set through the AND circuit 21b and the OR circuit 22 when the temporary mask set signal $SM_1$ goes to an active level. When both the interrupt request signal $IR_1$ and the interrupt right transfer signal ID go to an active level, the flip-flop 20 is reset, and the AND circuit 21a outputs the interrupt signal $IM_1$ to the interrupt controller 4-1.

Figure 8:
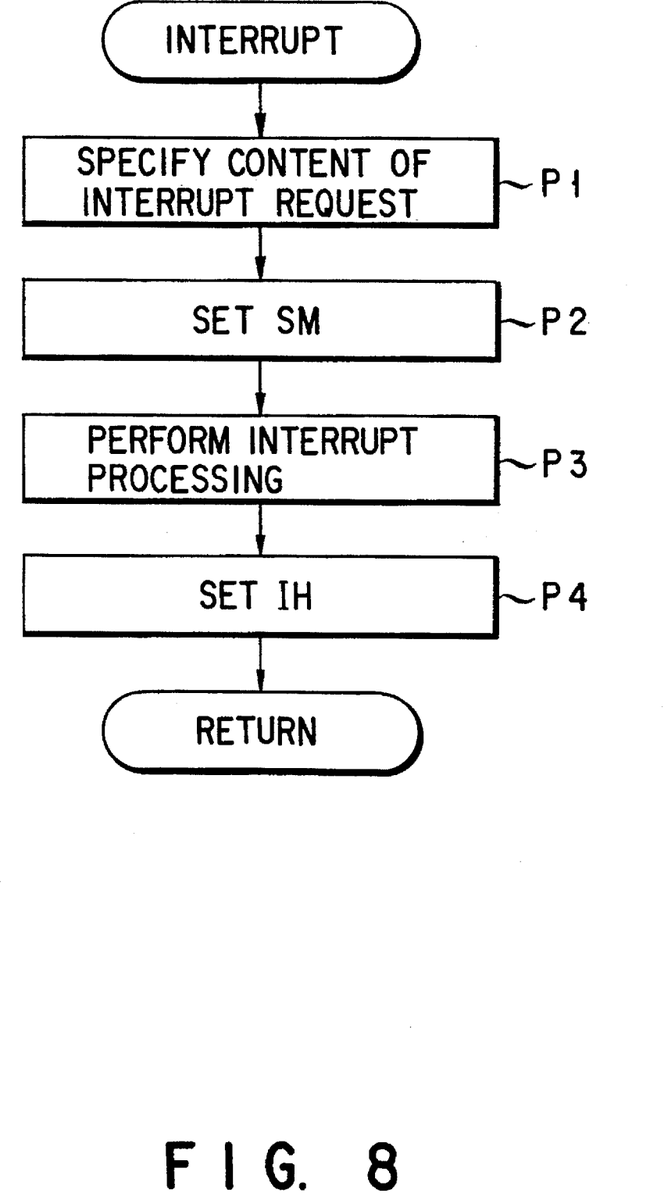
FIG. 8 is a flow chart for explaining an operation of the CPU.

Interrupt operations of the CPUs 2-1 to 2-n will be described below with reference to FIG. 8. When each of the CPUs 2-1 to 2-n receives the interrupt signal IA, the transferring of the interrupt right stop at the corresponding one of the interrupt right control circuits 3-1 to 3-n (step P1). Each of the CPUs 2-1 to 2-n accesses a corresponding one of the interrupt controllers 4-1 to 4-n to specify the interrupt content of the corresponding interrupt controller (step P1).

Each of the CPUs 2-1 to 2-n accesses a ports of the remaining processor modules, and sets a corresponding temporary mask set signal SM for masking the interrupt request from the I/O interface (step P2). For example, when the CPU 2-1 receives an interrupt signal from the floppy disk device I/O3, the CPU 2-1 accesses the ports $R_2$ to $R_n$ of other processor modules 1-2 to 1-n to set the temporary mask set signal $SM_3$ for temporarily masking an interrupt request $IR_3$ from the floppy disk device I/O3. This is because interrupt requests from the same I/O interface are received by the same module as much as possible, thereby effectively using storage contents of the cache memories in the CPUs.

The CPUs 2-1 to 2-n perform interrupt processing (step P3). When the interrupt processing is ended, each of the CPUs 2-1 to 2-n sets a corresponding clear signal IH at an active level (step P4). At this time, the interrupt right transfer signal ID goes to an active level, and the interrupt right is transferred to the next one of the interrupt right control circuits 3-1 to 3-n. The temporary mask of the interrupt request is reset every time the interrupt right is transferred once around in the circuit of the interrupt right control circuits 3-1 to 3-n. In other words, the interruption to any CPUs 2-1 to 2-n which no temporary mask is set is given priority from the time the interrupt request is made to the time the interrupt right goes once around in the circuit of the interrupt right control circuit 3-1 to 3-n.

Figure 9:
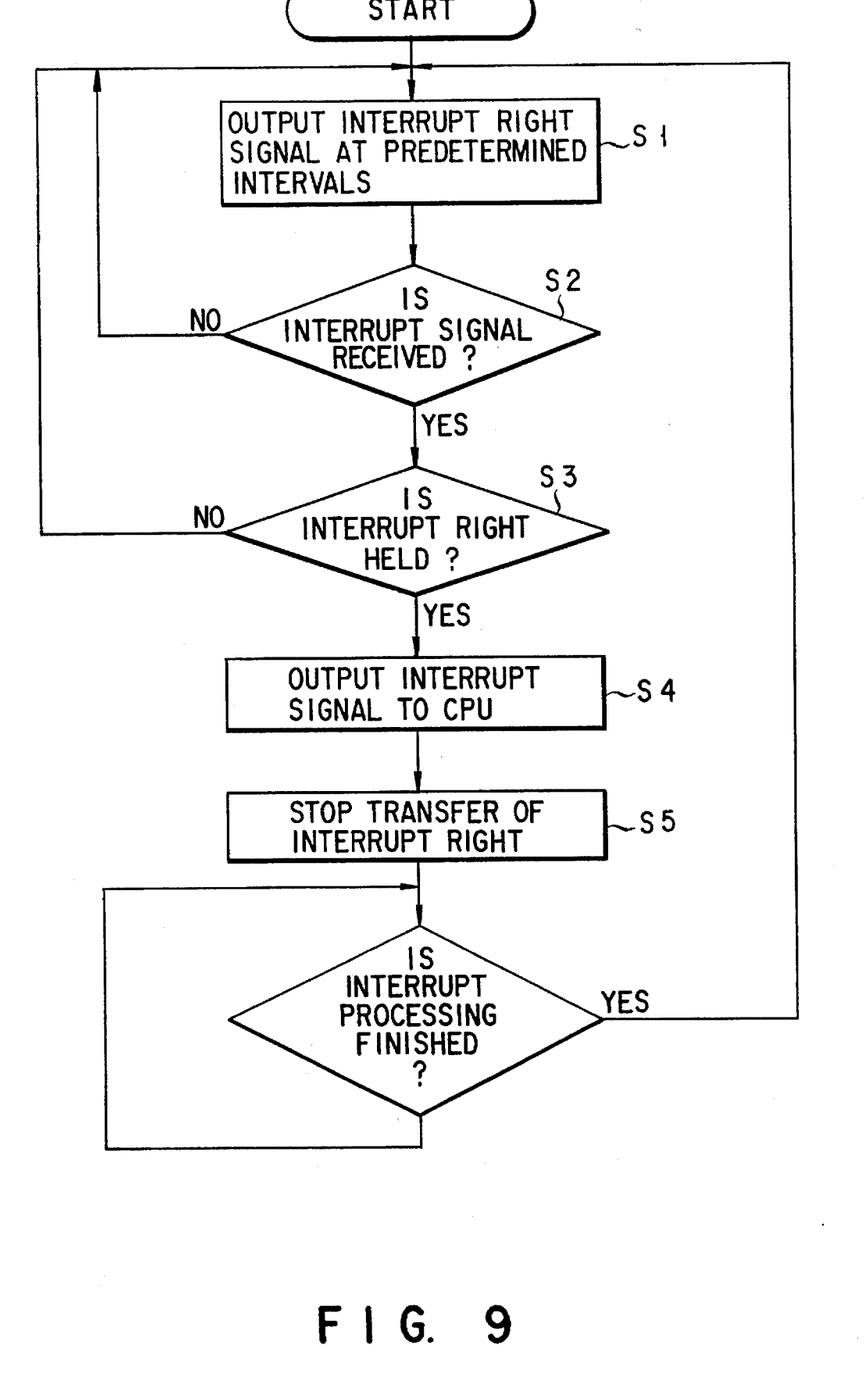
FIG. 9 is a flow chart for explaining an operation of an interrupt right control circuit.

Operations of the interrupt right control circuits 3-1 to 3-n will be described below with reference to the flow chart in FIG. 9. As represented in step S1, each of the interrupt right control circuits 3-1 to 3-n outputs the interrupt right transfer signal ID to the next one of the interrupt right control circuits at predetermined intervals. When the interrupt right transfer signal ID supplied from the previous stage goes to an active level, the interrupt right indication signal IE is set under the condition of logical expression (2), and the interrupt right transfer signal ID to the succeeding stage goes to an active level under the condition of logical expression (4). In this manner, the interrupt right is sequentially transferred in an order of the interrupt right control circuits 3-1, 3-2, ..., 3-n, 3-1, ...

When each of the interrupt right control circuits 3-1 to 3-n holds the interrupt right, and receives the interrupt signal IB from a corresponding one of the interrupt controllers 4-1 to 4-n (YES in step S2 and YES in step S3), the interrupt right control circuit outputs the interrupt signal IA to a corresponding one of the CPUs 2-1 to 2-n (step S4). That is, when the interrupt right indication signal IE is set according to expression (1), and the interrupt signal IB from the corresponding one of the interrupt controllers 4-1 to 4-n goes to an active level, the interrupt right control circuit outputs the interrupt signal IA to the corresponding one of the CPUs 2-1 to 2-n.

At this time, each of the interrupt right control circuits 3-1 to 3-n stops transferring the interrupt right and keeps holding the interrupt right (step S5). That is, the signal IP is set, and the interrupt right transfer signal ID is fixed at an inactive level, thereby stopping transferring the interrupt right to the next stage under the condition of logical expression (3) at the same time when the interrupt signal goes to the active level.

When each of the CPUs 2-1 to 2-n finishes the interrupt operation by, for example, accessing the I/O interface, each of the CPUs 2-1 to 2-n sets the clear signal IH at an active level. At this time, the input D of the flip-flop goes to an inactive level, and the signals IP goes to an inactive level. In this manner, the interrupt right transfer signal ID goes to an active level, and the interrupt right is transferred to the next one of the interrupt right control circuits 3-1 to 3-n of (YES in step S6).

Figure 10:
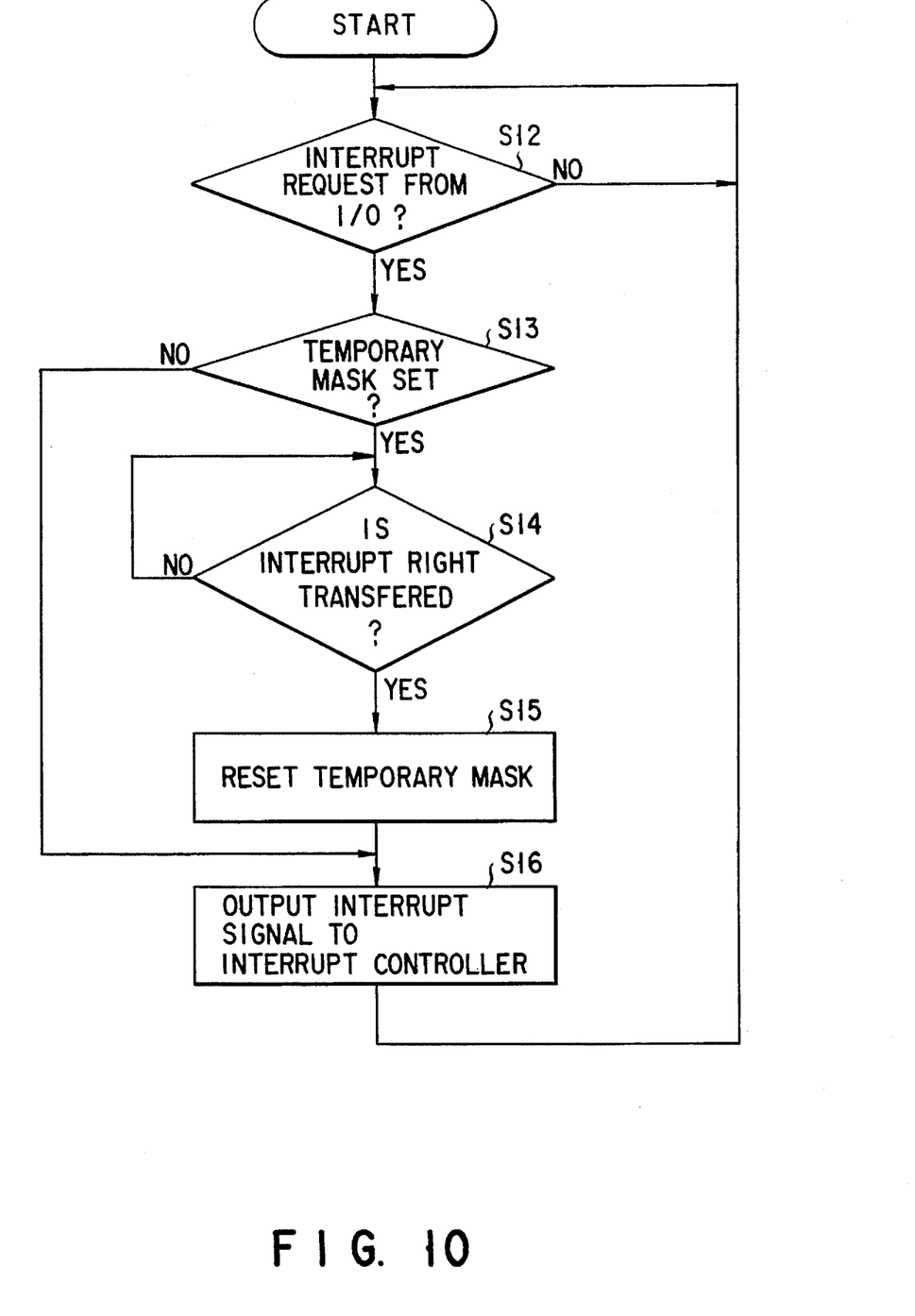
FIG. 10 is a flow chart for explaining an operation of an interrupt mask circuit.

Operations of the interrupt mask circuits 5-1 to 5-n will be described below with reference to FIG. 10. When the interrupt request signals $IR_1$ to $IR_m$ are output from the I/O interfaces I/O1 to I/Om (YES in step S12), each of the interrupt mask circuits 5-1 to 5-n supplies the interrupt signals $IM_1$ to $IM_m$ as they are to a corresponding one of the interrupt controllers 4-1 to 4-n when no temporary mask set signal $SM_1$ to $SM_n$ is set in the corresponding one of the interrupt mask circuits 5-1 to 5-n (NO in step S13). On the other hand, when the temporary mask set signal is set in the corresponding one of interrupt mask circuits 5-1 to 5-n, the interrupt mask circuit does not supply the interrupt signals $IR_1$ to $IR_m$ to the corresponding one of the interrupt controllers 4-1 to 4-n (YES in step S13). For example, when the temporary mask set signal $SM_1$ is set in the interrupt mask circuit, even when the interrupt request signal $IR_1$ is supplied to the interrupt mask circuits 5-1 to 5-n, the interrupt mask circuit 5-1 to 5-n does not supply the interrupt signal $IM_1$ to the corresponding interrupt controller. When the interrupt right is transferred to the processor module of the next stage (YES in step S14), the temporary mask set signals set in the mask circuit are reset (step S15). At this time, the interrupt request signals $IM_1$ to $IM_m$ blocked in step S13 are supplied to the corresponding interrupt controller (step S16).

Operations of the interrupt controllers will be described below. When each interrupt controller receives the interrupt request signals $IR_1$ to $IR_m$, a level specified by the interrupt request signals $IR_1$ to $IR_m$ is compared with an interrupt level set in the corresponding interrupt controller. When the interrupt level specified by the interrupt request signals $IR_1$ to $IR_m$ is lower than the interrupt level set in the corresponding interrupt controller, the interrupt request is neglected. When the interrupt level specified by the interrupt request signals $IR_1$ to $IR_m$ is higher than the interrupt level set in the corresponding interrupt controller, an interrupt vector is generated on the basis of the interrupt request signal, and the interrupt signal IB is output.

An operation of the overall multiprocessor system according to the first embodiment will be described below with reference to FIGS. 1 to 10.

When the system is powered, the initial reset signal RE is supplied to the CPUs 2-1 to 2-n, the interrupt controllers 4-1 to 4-n, the interrupt mask circuits 5-1 to 5-n, and the ports $R_1$ to $R_n$, and these circuits are initially reset.

On the other hand, the initial reset signal RE and the interrupt right setting signal IF set at an active level are supplied to one of the interrupt right control circuits 3-1 to 3-n (assuming that the interrupt right control circuit 3-1 is used). For this reason, the interrupt right indication signal IE goes to an active level. The initial reset signals RE and the interrupt right setting signal IF set at an inactive level are supplied to the interrupt right control circuits 3-2 to 3-n, and the interrupt right indication signal IE is set at an inactive level. With the above operation, the interrupt right control circuit 3-1 holds the interrupt right in an initial state.

The interrupt right transfer signal ID output from the interrupt right control circuit 3-1 goes to an active level in synchronism with rising of the clock CL, and the interrupt right control circuit 3-2 acquires the interrupt right. Thereafter, the interrupt right is sequentially transferred in response to the clock CL.

When the interrupt right control circuit 3-1 holds the interrupt right, it is assumed that the LAN I/O2 issues the interrupt request signal $IR_2$. The interrupt request signal $IR_2$ is supplied to all the interrupt mask circuits 5-1 to 5-n. At this time, assuming that the temporary mask set signals $SM_1$ to $SM_m$ are not set in the interrupt mask circuits 5-1 to 5-n, the interrupt mask circuits 5-1 to 5-n commonly supply the interrupt request signal $IM_2$ to the interrupt controllers 4-1 to 4-n.

Each of the interrupt controllers 4-1 to 4-n receives the interrupt request signal $IR_2$ from the LAN I/O2, and performs processing such as level control, mask control, and generation of an interrupt vector. For example, when a mask for an interrupt request is set in the interrupt controller 4-4, the interrupt right control circuit 4-4 masks all the input interrupt requests. In addition, when an interrupt request signal has an interrupt request priority level of 3, and an interrupt allowance level set in the interrupt controller 4-3 is set to be a priority level of 4 (higher than the priority level of 3), the interrupt controller 4-3 neglects this interrupt request signal. For example, when an interrupt request signal has a priority level of 3, and an interrupt allowance level set in the interrupt controller 4-1 is set to be a priority level of 2 (lower than the priority level of 3), the interrupt controller 4-1 supplies the interrupt signal IB to the interrupt right control circuit 3-1. As described above, since the interrupt right control circuit 3-1 has the interrupt right, the interrupt right control circuit 3-1 supplies the interrupt signal IA to the CPU 2-1.

Although each of the remaining interrupt right control circuits 3-1 to 3-n may receive the interrupt signal IB, since these interrupt right control circuits have no interrupt right, the interrupt signal IA is not output to a corresponding one of the CPUs 2-2 to 2-n.

The CPU 2-1, in response to the interrupt signal IA, and sets the temporary mask set signal $SM_1$ at the active level through the ports $R_2$ to $R_n$. In this manner, the remaining processor modules 1-2 to 1-n cannot receive the interrupt request signals from the LAN I/O2. The CPU 2-1 accesses the LAN I/O2 to perform interrupt processing, then, sets the clear signal IH at an active level through the port $R_1$. In this manner, the interrupt right is sequentially transferred between the control circuits again.

In a state wherein the interrupt right control circuit 3-2 has the interrupt right, it is assumed that the LAN I/O2 reissues the interrupt request signal $IR_2$. In this case, as described above, since the temporary mask set signal $SM_2$ at an active level is set in each of the ports $R_2$ to $R_n$, the interrupt request signal $IR_2$ is blocked by the interrupt mask circuit 5-2. When the interrupt right control circuit 3-2 outputs the interrupt right transfer signal ID, the temporary mask set signal $SM_2$ set in the port $R_2$ is reset, and the signal $IM_2$ is supplied to the interrupt controller 4-2. However, at this time, since the interrupt right control circuit 3-2 has no interrupt right, the interrupt right control circuit 3-2 cannot receive the interrupt request from the LAN I/O2. The same operation as described above is repeated in each of the processor modules 1-3 to 1-n. When the interrupt right control circuit 3-1 has the interrupt right, the interrupt right control circuit 3-1 can receive the interrupt request. The CPU 2-1 performs interrupt processing by effectively using the data in the cache memory of the CPU 2-1. If the interrupt allowance level set in the interrupt controller 4-1 is higher than the priority level of the interrupt request of the LAN I/O2, one of other CPUs 2-2 to 2-n receives the interrupt signal.

When the CPU 2-1 to 2-n accesses the interrupt controllers 4-1 to 4-n and/or the interrupt mask circuits 5-1 to 5-n regardless the interrupt requests, the CPU 2-1 to 2-n set the interrupt right stop signal IG of the processor module to which the CPU belongs, then the CPU checks the corresponding interrupt indication signal IE. If the interrupt indication signal IE is at active level, the CPU can exclusively access the interrupt controllers 4-1 to 4-n and the interrupt mask circuits 5-1 to 5-n of any processor modules 1-1 to 1-n.

According to this embodiment, when an I/O interface issues an interrupt request, a processor which can receive the interrupt request can immediately receive the interrupt request. In addition, when transfer of the interrupt right between the interrupt right control circuits 3-1 to 3-n is controlled, resources related to the interrupt (circuits required for interrupt processing) can be exclusively processed. Therefore, contention of the processors for interrupt access can be avoided. In addition, when the processor which receives the interrupt request sets a mask signal in each of the remaining processor modules, the processor can preferentially receive a next interrupt request.

The present invention is not limited to the above embodiments. In the first embodiment, when a processor module transfers an interrupt right to the processor module of the next stage, the interrupt mask circuit 5 in the processor module resets the temporary mask set signals. The present invention is not limited to the first embodiment. For example, the temporary mask set signals may be reset when two or three transfer cycles of the interrupt right between the interrupt right control circuits are preformed, and the temporary mask set signals may be reset a predetermined time after the temporary mask set signals are set at an active level.

(Second Embodiment)

In the first embodiment, the processors (CPUs) 2-1 to 2-n can program the interrupt controllers 4-1 to 4-n to mask interrupt requests. On the other hand, when the processors 2-1 to 2-n use interrupt inhibit instructions incorporated in the CPUs, the processors 2-1 to 2-n can inhibit all external interrupt signals at high speed without controlling interrupt controllers.

In the multiprocessor system in FIG. 1, when a processor uses its own external interrupt inhibit instruction, in a state wherein an interrupt signal IA is supplied from an interrupt right control circuit to a CPU, the CPU does not receive the interrupt signal. As a result, although the remaining CPUs can process the interrupt request, the interrupt request is set in a standby state. In order to solve the above problem, even when the CPUs use their own external interrupt inhibit instructions, the interrupt controllers must be programmed, and interrupt signals from all the external I/O interfaces must be inhibited.

In addition, in a multitask, multiuser operating system such as UNIX, CPUs are frequently set in a "state of inhibiting all external interrupt signals". For this reason, in the arrangement of the first embodiment, desirable performance may not be obtained. Therefore, in the second embodiment of the present invention, a mask circuit is arranged between an interrupt controller and an interrupt right control circuit, and all interrupt signals can be inhibited, or the interrupt inhibit state can be released.

Figure 11:
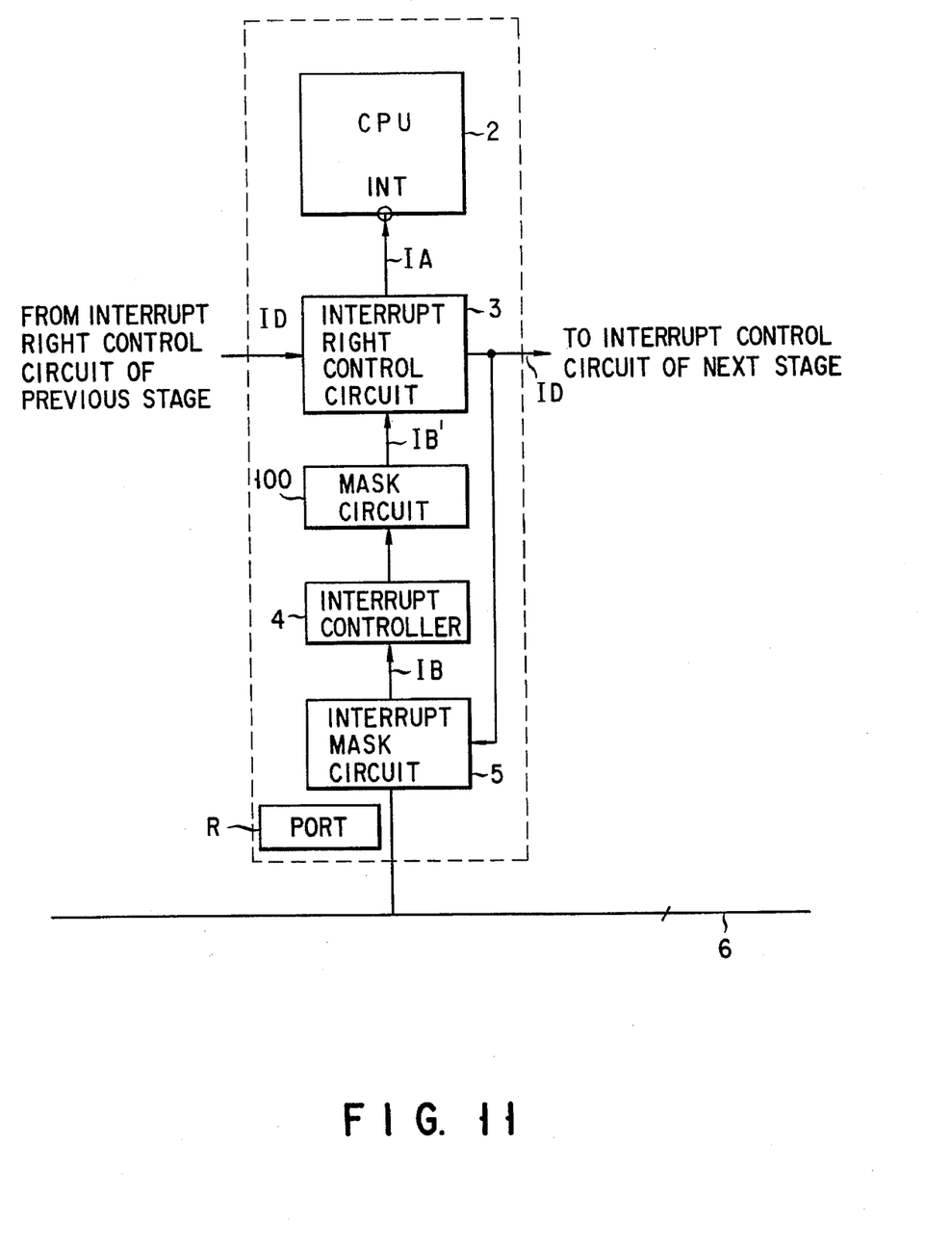
FIG. 11 is a block diagram of a processor module according to the second embodiment of the present invention.

The arrangement of a processor module according to the second embodiment is shown in FIG. 11. Note that the same reference numerals as in FIG. 1 denote the same parts in FIG. 11.

In FIG. 11, although a CPU 2 has the same basic arrangement as that of each of the CPUs shown in FIG. 2, the CPU 2 has a function of inhibiting all external interrupt signals or releasing the interrupt inhibit state and a function of setting signals SETMASK and CLRMASK (to be described later). The arrangements of an interrupt right transfer control circuit and a temporary mask circuit are the same as those in FIG. 1.

Figure 12:
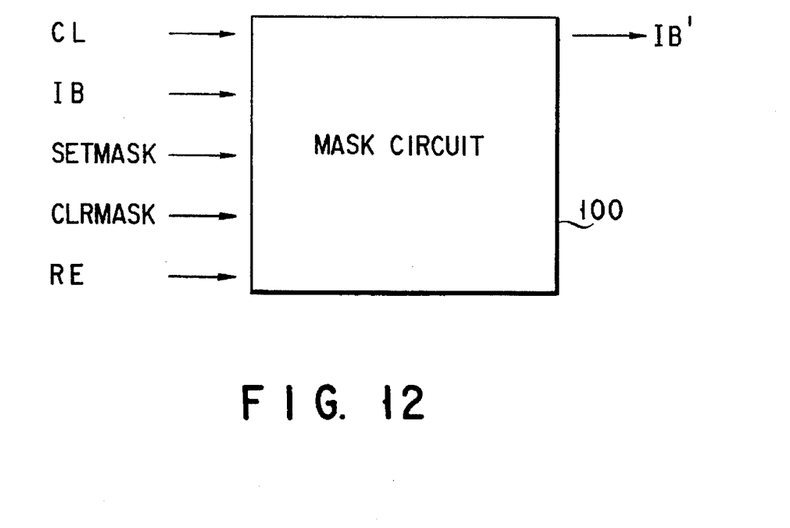
FIG. 12 is a view for explaining input/output signals of a mask circuit.

A mask circuit 100, as shown in FIG. 12, receives a clock signal CL, an interrupt signal IB output from an interrupt controller 4, a mask setting signal SETMASK, a mask clear signal CLRMASK, and a reset signal RE, and supplies an interrupt signal IB' to an interrupt control circuit 3. The mask setting signal SETMASK and the mask clear signal CLRMASK are supplied from, e.g., a port R. The mask setting signal SETMASK is set at an active level by the CPU 2 itself when the CPU 2 inhibits all external interrupt signals in accordance with an interrupt inhibit instruction. The mask clear signal CLRMASK is set at an active level when the CPU 2 releases the interrupt inhibit state.

The arrangement of the mask circuit 100 is represented by logical expressions (11) and (12):

$$IB':=IB*/MASK \qquad (11)$$

$$MASK:=SETMASK*/RE+MASK*/RE*/CLRMASK \qquad (12)$$

where the left-hand side of "=" represents a logical output of the right-hand side; ":=" is a symbol representing a Q output from a D flip-flop; the left-hand side is the Q output; the right-hand side is a D input; "*" is a logical product (AND); "+" is a logical sum (OR); and "/" is negation (inverter). A clock input to the D flip-flop is the clock signal CL.

Figure 13:
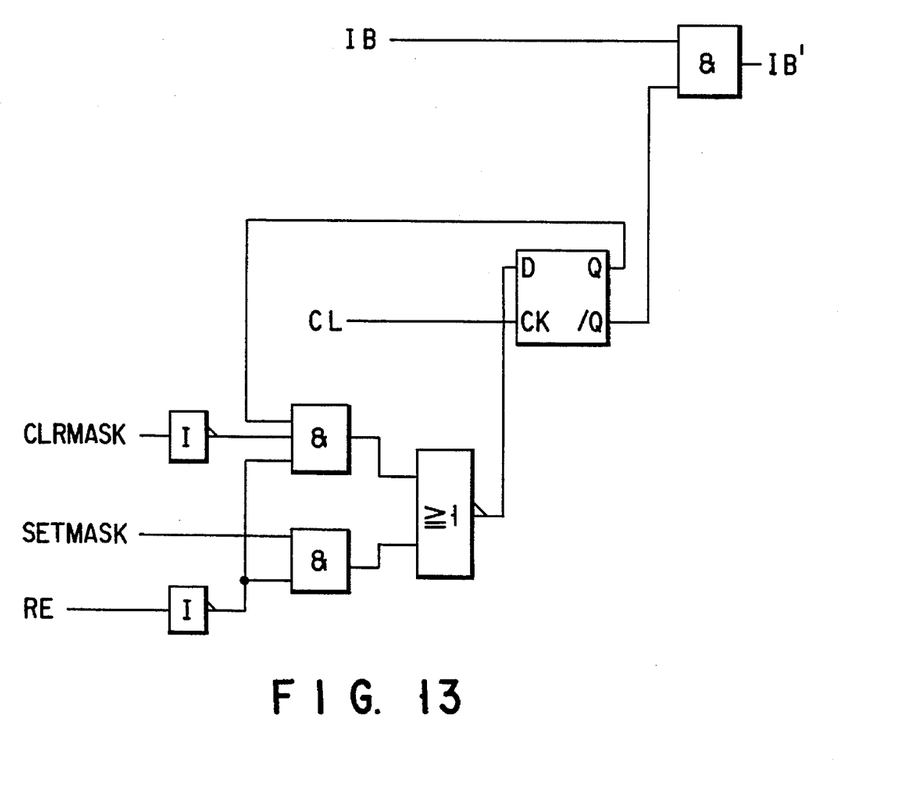
FIG. 13 is a logic circuit diagram showing the arrangement of the mask circuit.

A logic circuit according to expressions (11) and (12) is arranged as shown in FIG. 13.

In the second embodiment, when the CPU 2 is to inhibit external interrupt signals or release the inhibit state in accordance with an interrupt inhibit instruction or an inhibit release instruction, the CPU 2 sets the mask setting signal SETMASK or the mask clearing signal CLRMASK. When the mask setting signal SETMASK is set, the interrupt signal IB is blocked by the mask circuit 100 and does not reach the CPU 2.

According to the second embodiment, by a simple operation, all interrupt signals can be inhibited, and the interrupt inhibit state can be released. When the CPU 2 is operated under an operating system such as UNIX in which a "state of inhibiting all interrupt signals is frequently set", the present invention is very effective to properly process an interrupt request. In addition, in a multiprocessor system, an interrupt function is frequently required between the processors. When a given processor interrupts another processor, all external interrupt signals must be inhibited. Therefore, the arrangement of the second embodiment is very effective for the multiprocessor system.

As described above, according to the present invention, the frequency of setting an interrupt request from an I/O interface in a standby state is considerably reduced, and the efficiency of interrupt processing is improved. In addition, since processors are not connected to the I/O interface through special hardware in the arrangement, software related to the interrupt control of the multiprocessor system can be developed by slightly changing single-processor software. Even when a processor itself has a function of inhibiting all external interrupt signals, an interrupt request can be properly processed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multiprocessor comprising:

a plurality of processor modules;

a plurality of input/output interfaces, each for issuing an interrupt request; and bus means for connecting each of said processor modules to each of said input/output interfaces, and for transferring said interrupt requests to each of said processor modules;

each said processor module including:

an interrupt mask circuit for outputting, in response to reception of one of said interrupt requests by said processor module, a first interrupt signal when temporary mask information of said interrupt mask circuit indicates unmasking of said received interrupt request;

an interrupt controller for outputting, in response to said first interrupt signal, a second interrupt signal when said interrupt request satisfies a predetermined condition that is based on a priority level of said interrupt controller;

an interrupt right control circuit, connected to a succeeding one of said plurality of processor modules, for transferring an interrupt right to said interrupt right control circuit of said succeeding one of said plurality of processor modules at predetermined intervals, for setting said temporary mask information of said interrupt mask circuit to indicate unmasking of said received interrupt request, and when said interrupt right control circuit has said interrupt right, for outputting a third interrupt signal and suspending transferring of said interrupt right, in response to said second interrupt signal; and a processor having a cache memory, wherein said processor is connected to said interrupt mask circuits of said plurality of processor modules, said interrupt controllers of said plurality of processor modules and said interrupt right control circuit, and wherein said processor:

sets said priority level of said interrupt controller of each of said plurality of processor modules, sets, in response to said third interrupt signal, said temporary mask information of said interrupt mask circuit of all other processor modules to indicate masking of said received interrupt request, processes the interrupt request using data stored in said cache memory after said temporary mask information of said interrupt mask circuit of all other processor modules is set by said processor, and causes, after said processor processes said interrupt request, said interrupt right control circuit to resume transferring said interrupt right to said interrupt right control circuit of said succeeding one of said plurality of processor modules.

2. A system according to claim 1, wherein said multiprocessor system has means for supplying the interrupt right to one of said interrupt right control means when the multiprocessor is turned on.

3. A system according to claim 1, wherein each said processor module further comprises mask means, which is arranged between said interrupt controller and said interrupt right control circuit and is controlled by said processor, for masking said interrupt signals from said interrupt controller.

4. A multiprocessor system comprising a plurality of processor modules, each of said processor modules including:

an interrupt mask circuit for outputting, in response to reception of an interrupt request, a first interrupt signal when temporary mask information of said interrupt mask circuit indicates unmasking of said interrupt request;

an interrupt controller for outputting, in response to said first interrupt signal, a second interrupt signal when said interrupt request satisfies a predetermined condition that is based on a priority level of said interrupt controller;

an interrupt right control circuit, connected to a succeeding one of said plurality of processor modules, for transferring an interrupt right to said interrupt right control circuit of said succeeding one of said plurality of processor modules at predetermined intervals, for setting said temporary mask information of said interrupt mask circuit to indicate unmasking of said interrupt request, and when said interrupt right control circuit has said interrupt right, for outputting a third interrupt signal and suspending transferring of said interrupt right, in response to said second interrupt signal; and a processor having a cache memory, wherein said processor is connected to said interrupt mask circuits of said plurality of processor modules, said interrupt controllers of said plurality of processor modules and said interrupt right control circuit, and wherein said processor:

sets said priority level of said interrupt controller of each of said plurality of processor modules, sets, in response to said third interrupt signal, said temporary mask information of said interrupt mask circuit of all other processor modules to indicate masking of said interrupt request, processes said interrupt request using data stored in said cache memory after said temporary mask information of said interrupt mask circuit of all other processor modules is set by said processor, and causes, after said processor processes said interrupt request, said interrupt right control circuit to resume transferring said interrupt right to said interrupt right control circuit of said succeeding one of said plurality of processor modules.

5. A system according to claim 4, wherein said multiprocessor system further includes means for supplying the interrupt right to only one of said plurality of interrupt right control means when said multiprocessor system is turned on.

6. A system according to claim 4, wherein said interrupt controller generates an interrupt vector.

7. A system according to claim 4, wherein:

said processor outputs a signal to said interrupt right control means, for stopping said transferring of said interrupt right to said succeeding one of said processing modules, in response to said interrupt signals; and said interrupt right control means stops said transferring of said interrupt right to said succeeding one of said processing modules upon receiving said signal from said processor.

8. A system according to claim 4, wherein:

said processor outputs a signal to said interrupt right control means for enabling said transferring of said interrupt right to said succeeding one of said processing modules, after a predetermined processing has been performed; and said interrupt right control means transfers said interrupt right to said succeeding one of said processing modules upon receiving said signal from said processor.

9. A system according to claim 4, wherein each said processor modules further comprises mask means, which is arranged between said interrupt controller and said interrupt right control circuit and is controlled by said processor, for masking said interrupt signals.

10. A system according to claim 9, wherein said processor has a function for inhibiting an external interrupt signal and is connected to said mask means, and wherein said processor causes said mask means to inhibit said interrupt signal when said processor inhibits said external interrupt signal.

11. A method of processing an interrupt request in a multiprocessor including a plurality of processor modules, said method comprising the steps of:

transferring an interrupt right among said plurality of processor modules in a predetermined order;

supplying an interrupt request from an input/output interface to each said processor module;

causing, upon receipt of said interrupt right, said processor module that contains temporary mask information that indicates unmasking of said interrupt request to generate an interrupt signal when said interrupt request satisfies a predetermined condition that is based upon a priority level of said processor module, wherein said priority level of said processor module is set by one of said plurality of processor modules;

stopping, upon generation of said interrupt signal, said transferring of said interrupt right among said plurality of processor modules in a predetermined order;

causing said processor module that generates said interrupt signal to:

set said temporary mask information of all other processor modules to indicate masking of said interrupt request, process, after setting said temporary mask information of all other processor modules, said interrupt request using data stored in a cache memory of a processor of said processor module, and reset said transferring of said interrupt right among said plurality of processor modules in a predetermined order after processing said interrupt request.

* * * * *